(12) United States Patent  
Lu

(10) Patent No.: US 10,021,366 B2  
(45) Date of Patent: Jul. 10, 2018

(54) IMAGE PROCESS APPARATUS

(71) Applicant: Etron Technology, Inc., Hsinchu (TW)

(72) Inventor: Chao-Chun Lu, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 510 days.

(21) Appl. No.: 14/290,958

(22) Filed: May 29, 2014

(65) Prior Publication Data

US 2015/0319425 A1     Nov. 5, 2015

Related U.S. Application Data

(60) Provisional application No. 61/987,509, filed on May 2, 2014.

(51) Int. Cl.
| | |
|---|---|
| H04N 13/00 | (2018.01) |
| H04N 13/02 | (2006.01) |
| H04N 13/204 | (2018.01) |
| H04N 13/271 | (2018.01) |
| H04N 13/293 | (2018.01) |
| H04N 13/296 | (2018.01) |

(52) U.S. Cl.
CPC ....... *H04N 13/004* (2013.01); *H04N 13/0022* (2013.01); *H04N 13/0203* (2013.01); *H04N 13/0239* (2013.01); *H04N 13/0271* (2013.01); *H04N 13/0292* (2013.01); *H04N 13/0296* (2013.01); *H04N 13/204* (2018.05); *H04N 13/271* (2018.05); *H04N 13/293* (2018.05); *H04N 13/296* (2018.05); *H04N 2013/0092* (2013.01)

(58) Field of Classification Search
CPC ... H04N 13/204; H04N 13/271; H04N 13/296

USPC .......................................................... 348/46
See application file for complete search history.

(56) References Cited

U.S. PATENT DOCUMENTS

| | | | |
|---|---|---|---|
| 4,493,106 A | * | 1/1985 | Farhangi ............... H04N 5/235 382/271 |
| 7,024,054 B2 | | 4/2006 | Cahill |
| 2003/0091225 A1 | | 5/2003 | Chen |

(Continued)

FOREIGN PATENT DOCUMENTS

| | | |
|---|---|---|
| CN | 101610421 B | 12/2011 |
| TW | M508084 | 9/2015 |

*Primary Examiner* — Jeffery Williams  
(74) *Attorney, Agent, or Firm* — Winston Hsu

(57) ABSTRACT

An image process apparatus includes an image capture device, a filter, a receiver, an input interface, a mixture unit, and an output interface. The image capture device captures an original image and generates a depth map corresponding to the original image, wherein the original image includes at least a first object within a first depth range of the depth map and the other objects not within the first depth range of the depth map. The receiver stores a value of the first depth range and the input interface receives an input image. The filter removes the other objects from the original image and generates a temporary image which includes the first object based on the value of the first depth range. The mixture unit combines the temporary image with the input image, and generates a blending image which is then outputted by the output interface to an external display.

18 Claims, 6 Drawing Sheets

(56) References Cited

U.S. PATENT DOCUMENTS

| | | | |
|---|---|---|---|
| 2005/0129305 A1* | 6/2005 | Chen | G06K 9/20 382/154 |
| 2005/0190133 A1* | 9/2005 | Kawachi | G09G 3/3659 345/87 |
| 2009/0136091 A1* | 5/2009 | Woodfill | G06K 9/32 382/106 |
| 2010/0110285 A1* | 5/2010 | Nobori | H04N 19/172 348/384.1 |
| 2011/0002541 A1* | 1/2011 | Varekamp | G06T 7/0081 382/173 |
| 2011/0090311 A1* | 4/2011 | Fang | H04N 7/15 348/43 |
| 2012/0002112 A1* | 1/2012 | Huang | H04N 5/144 348/579 |
| 2012/0219236 A1* | 8/2012 | Ali | G06T 5/002 382/276 |
| 2012/0293499 A1 | 11/2012 | Lee | |
| 2014/0254919 A1* | 9/2014 | Sun | G06K 9/3233 382/154 |

\* cited by examiner

IMAGE PROCESS APPARATUS

CROSS REFERENCE TO RELATED APPLICATIONS

This application claims the benefit of U.S. Provisional Application No. 61/987,509, filed on May 2, 2014 and entitled "Image process apparatus," the contents of which are incorporated herein by reference.

BACKGROUND OF THE INVENTION

1. Field of the Invention

The present invention relates to an image process apparatus, more particularly, an image process apparatus for inserting portion of a first image into a second image based on depth map information of the first image.

2. Description of the Prior Art

Dual-cameras module is widely used in many terminal devices, such as notebooks or smart-phones, for image processing purpose. For example, new HTC M8 smart-phones utilize embedded dual-cameras module to bring blurry objects into focus before or after image shoot. Therefore, how to create new applications for those terminal devices with dual-cameras module is an attractive topic.

SUMMARY OF THE INVENTION

The object of this invention is to mix an original image (or video) captured by a stereo camera with an input image (or video). Another object of this invention is to insert portion of the original image into the input image based on depth map information of the original image.

According to an embodiment of the present invention, the image process apparatus includes an image capture device, a filter, and a mixture unit. The image capture device captures the original image and generates a depth map corresponding to the original image, wherein the original image comprises at least a first object within the first depth range of the depth map and the other objects not within the first depth range of the depth map. The filter removes the other objects from the original image and generates a temporary image which includes the first object. The mixture unit combines the temporary image with the input image, and generates a blending image which is then outputted to an external display or monitor.

According to another embodiment of the present invention, the image process apparatus includes an image capture device, a filter, a receiver, an input interface, a mixture unit, and an output interface. The image capture device captures the original image and generates a depth map corresponding to the original image, wherein the original image comprises at least a first object within the first depth range of the depth map and the other objects not within the first depth range of the depth map. The receiver stores the value of the first depth range and the input interface receives an input image. The filter removes the other objects from the original image and generates a temporary image which includes the first object based on the depth map and the first depth range stored in the receiver. The mixture unit combines the temporary image with the input image from the input interface, and generates a blending image which is then outputted by the output interface.

According to another embodiment of the present invention, the receiver of the image process apparatus includes a setting device to change the value of the first depth range, which could be a button to adjust the value of the first depth range, or a wireless interface to receive the value of the first depth range from a remote controller.

According to another embodiment of the present invention, the filter of the image process apparatus further includes a recognition device to identify the first object in the first depth range which is moving, and to generate a temporary image which only includes the moving first object within the first depth range.

According to another embodiment of the present invention, the mixture unit of the image process apparatus further includes a transforming device to deform the first object and the blending image includes the deformed object.

Many other advantages and features of the present invention will be further understood by the following detailed description and the appended drawings.

These and other objectives of the present invention will no doubt become obvious to those of ordinary skill in the art after reading the following detailed description of the preferred embodiment that is illustrated in the various figures and drawings.

DETAILED DESCRIPTION

In order to allow the advantages, spirit and features of the present invention to be more easily and clearly understood, the embodiments and appended drawings thereof are discussed in the following. However, the present invention is not limited to the embodiments and appended drawings.

Figure 1:
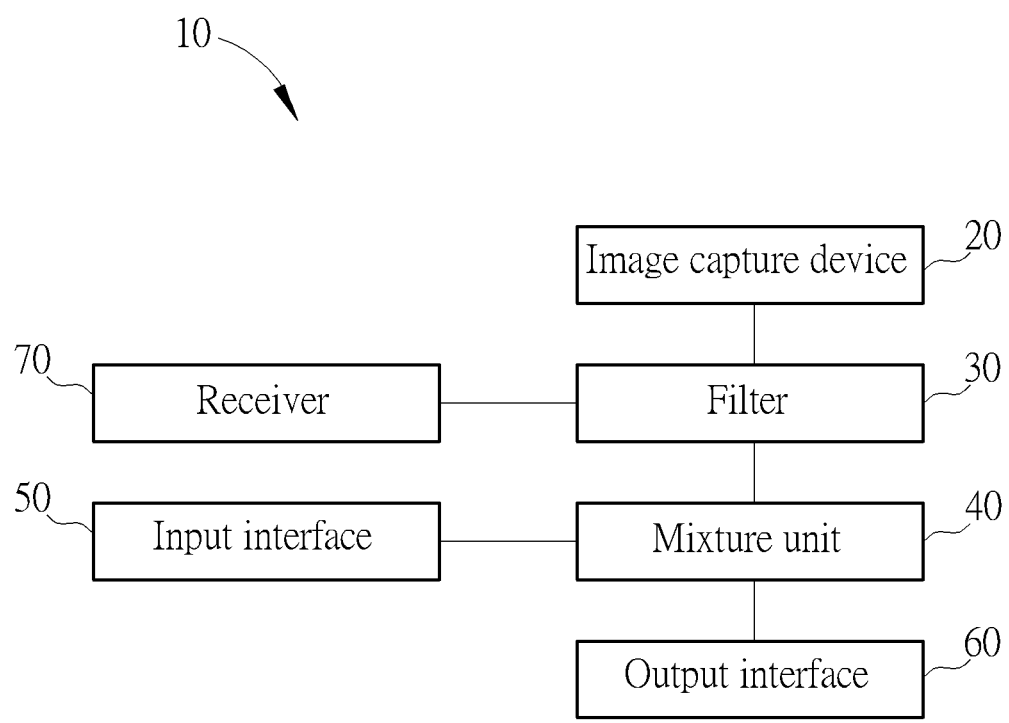
FIG. 1 is a block diagram illustrating an image process apparatus according to an embodiment of the invention.

Please refer to FIG. 1. FIG. 1 shows the block diagram of the image process apparatus 10. The image process apparatus 10 includes an image capture device 20, a filter 30, a mixture unit 40, an input interface, an output interface, and a receiver 70. The image capture device 20 captures an original image and generates a depth map corresponding to the original image. In one embodiment of this invention the image capture device 20 includes a stereo camera with two or more image sensors therein to captures a first image and a second image corresponding to the original image. The image capture device 20 could generate the depth map based on the first image and the second image generated from the stereo camera. To generate the depth map, synchronized signal could be embodied in each scan line of each frame of the first and the second image by the image capture device 20. For example, the first image includes a first frame and the second image includes a second frame, and the image capture device inserts synchronized signal in each scan line of the first and the second frames.

In one example, the first and the second frames each includes 720 scan lines, the first scan line of the first frame corresponds to the first scan line of the second frame. The same synchronized signal is embodied to the first scan line of the first frame and the first scan line of the second frame, such that the depth map information regarding the first scan line of the first frame and the first scan line of the second frame can be calculated. The frequency of the synchronized signal is changeable dependent on the number of the scan line (or resolution) of the first and the second images.

Of course, in another embodiment this original image could include a stream video data with a set of original frame, and the depth map includes a plurality of depth map information corresponding to the set of original frame. For example, the first image includes a first set frame and the second image includes a second set of frame, and the depth map includes a plurality of depth map information which is generated by the image capture device based on the first set frame and the second set of frame. The plurality of depth map information corresponds to the set of original frame.

The original image comprises at least a first object within the first depth range of the depth map and a second object not within a first depth range of the depth map. In one example the first object could include a man 31 and a woman 32 in front of a display 100 within the first depth range between Z1 and Z2, and the second object could be an floor light 33 outside the first depth range, as shown in FIG. 2.

The receiver 70 stores the value of the first depth range which could be predetermined. On the other hand, the receiver 70 includes a setting device to change the value of the first depth range stored in the receiver. For example, this setting device could be a button on the image process apparatus 10 for users to adjust the first depth range. In another example, this setting device could be a wireless interface to receive the value of the first depth range from a remote controller.

Figure 2:
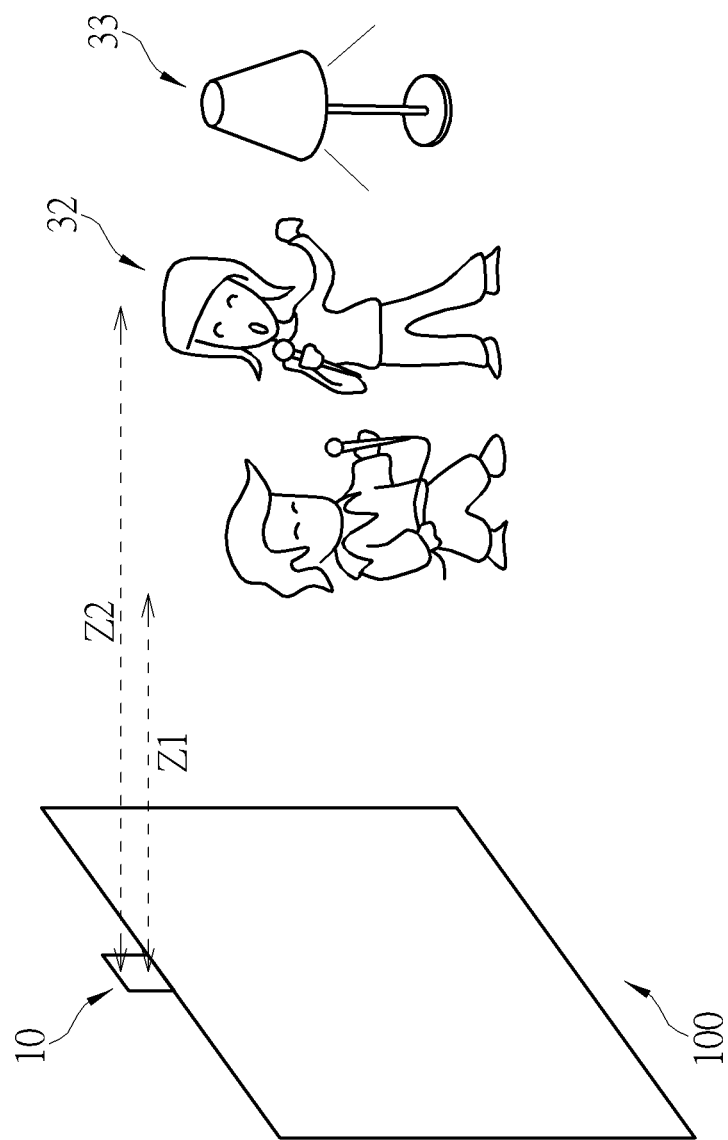
FIG. 2 is a schematic diagram illustrating an image process apparatus used in an environment with an external display.

The filter 30 based on the depth map and the first depth range in the receiver 70 removes the second object (such as the floor light 33 in FIG. 2) from the original image and generates a temporary image which just includes the first object (such as the man 31 and the woman 32 in FIG. 2). In such situation, those objects outside the first depth range of the depth map will be removed from the original image by the filter 30, and the temporary image just includes the rest objects within the first depth range of the depth map. In another example, the filter just picks up or selects the first object from the original image and generates a temporary image which includes the first object.

In another example, the filter further includes a recognition device to identify the first object in the first depth range which is moving, and generates a temporary image which only includes the moving first object within the first depth range.

Figure 3:
FIG. 3 is a schematic diagram illustrating an example of the input image.

The input interface 50 is provided to receive the input image. This input interface 50 could be a USB interface, a HDMI interface, a thunderbolt interface, or other interface which could receive the input image. The mixture unit 40 combines the temporary image with the input image and generates a blending image. For example, the input image is the mountain image as shown in FIG. 3. Of course, in another embodiment, the input image can be a stream video or a movie with a set of frames.

Figure 4:
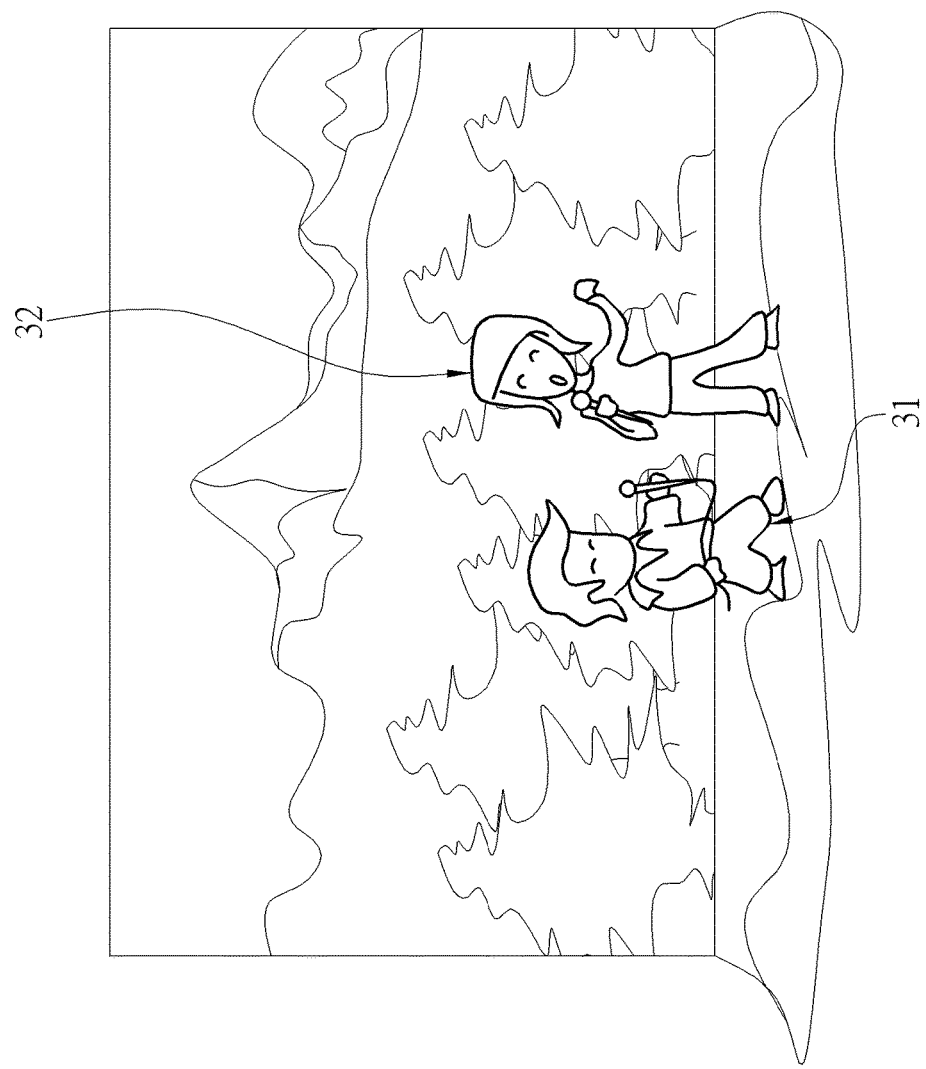
FIG. 4 is a schematic diagram illustrating an example of the blending image.
Figure 5:
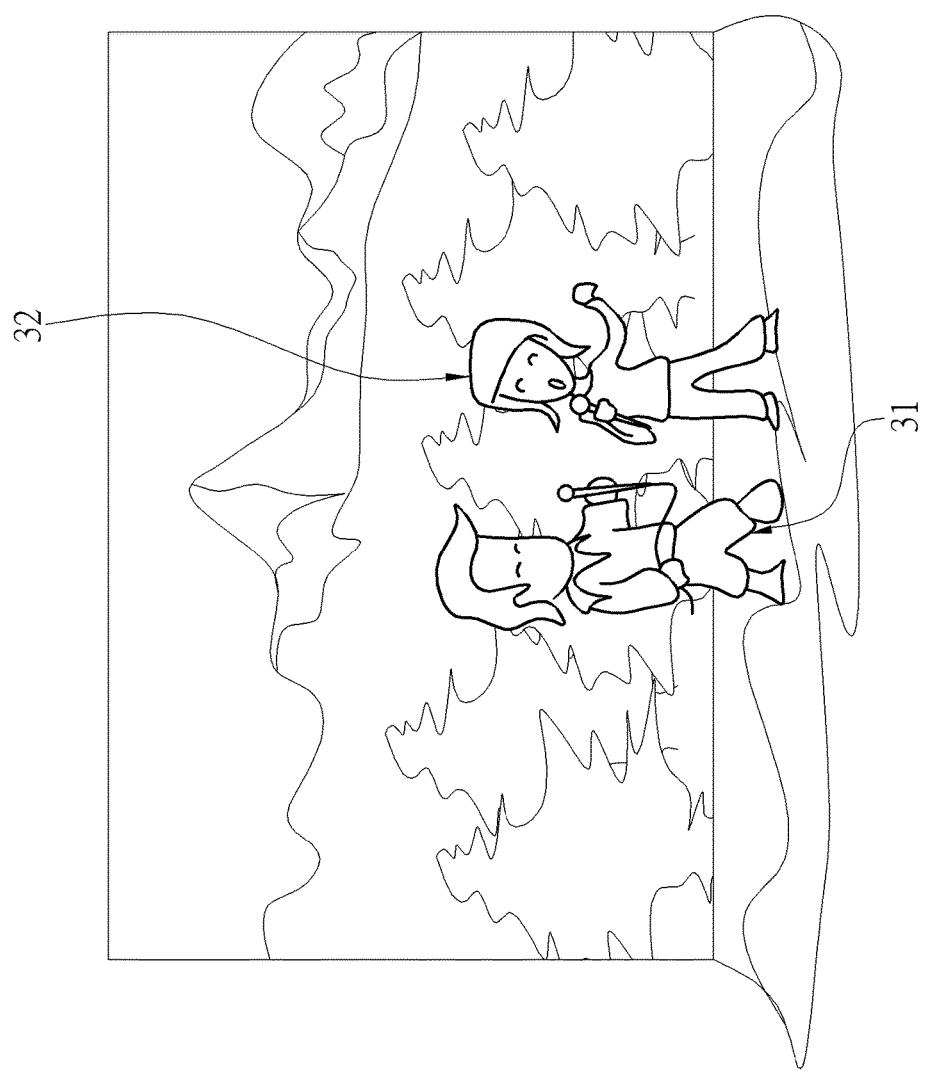
FIG. 5 is a schematic diagram illustrating another example of the blending image.

Based on the temporary image and the input image in FIG. 3, the blending image generated by the mixture unit 40 is shown in the FIG. 4 as follows. That is, the blending image includes the input image and the first object. In another example, the mixture unit 40 further includes a transforming device to deform the first object and the blending image includes the deformed object. For example, the man 31 is deformed and looks taller as shown in the FIG. 5.

The output interface 60 is provided to output the blending image. This output interface 60 could be a USB interface or other interface which could output the output image. For example, the output interface 60 includes a HDMI interface which can output the blending image to an external display 100.

Figure 6:
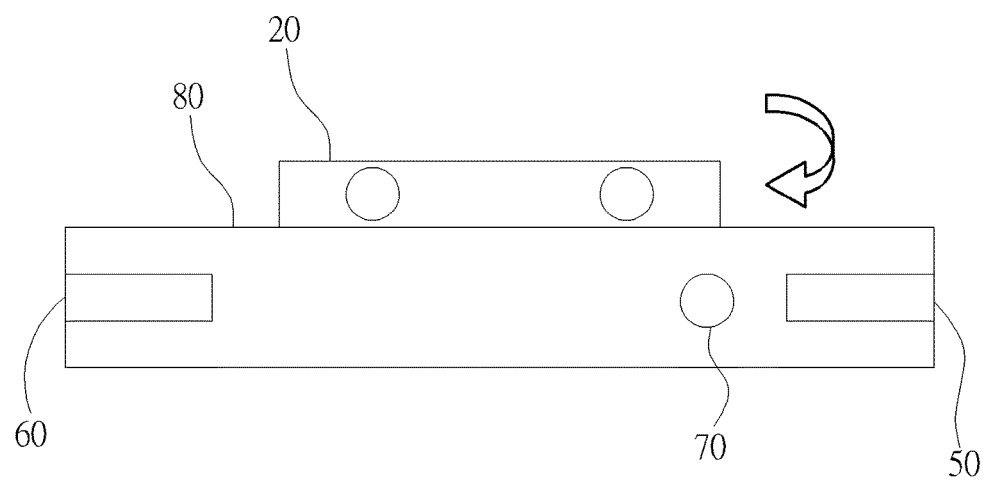
FIG. 6 is a schematic outlook of an image process apparatus according to an embodiment of the invention.

FIG. 6 shows an example outlook of the image process apparatus which includes a box 80. The input interface 50 and the output interface 60 are respectively disposed within the box to receive the input image and output the blending image. The receiver 70 is also disposed within the box 80 to receive the value of the first depth range determined by the user. The image capture device 20 is disposed on the box 80 and the view angle of the image capture device 20 is adjustable, either manually or automatically, to capture the first object. For example, the image capture device 20 is rotated manually to capture the first object within the first depth range.

With the examples and explanations mentioned above, the features and spirits of the invention are hopefully well described. Importantly, the present invention is not limited to the embodiments described herein. Those skilled in the art will readily observe that numerous modifications and alterations of the device may be made while retaining the teachings of the invention. Accordingly, the above disclosure should be construed as limited only by the metes and bounds of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image process apparatus, comprising:
an image capture circuit capturing an original image and generating a depth map corresponding to the original image, wherein the original image comprises at least a first object within an adjustable first depth range of the depth map and another object not within the adjustable first depth range of the depth map, and the original image further comprises a first image and a second image, the first image comprises at least one first frame and the second image comprises at least one second frame, and the image capture circuit further inserts synchronized signal in each scan line of the at least one first frame and the at least one second frame;
a filter utilizing the adjustable first depth range to remove the other object from the original image and generating a temporary image which includes the first object, wherein the temporary image is within the original image and corresponds to the adjustable first depth range; and
a mixture circuit combining the temporary image with an input image, and generating a blending image which includes the input image and the first object.

2. The image process apparatus of claim 1, further comprising a receiver storing a value of the adjustable first depth range.

3. The image process apparatus of claim 2, wherein the receiver includes a setting device to change the value of the adjustable first depth range.

4. The image process apparatus of claim 3, the setting device is a button to adjust the value of the adjustable first depth range.

5. The image process apparatus of claim 3, the setting device is a wireless interface to receive the value of the adjustable first depth range from a remote controller.

6. The image process apparatus of claim 1, further comprising an input interface to receive the input image.

7. The image process apparatus of claim 6, the input interface is a HDMI interface, a USB interface, or a thunderbolt interface.

8. The image process apparatus of claim 1, further comprising an output interface to receive the blending image from the mixture circuit and output the blending image to an external display.

9. The image process apparatus of claim 8, the output interface is a HDMI interface, a USB interface, or a thunderbolt interface.

10. The image process apparatus of claim 1, wherein the filter further includes a recognition device to identify the first object in the adjustable first depth range which is moving, and to generate a temporary image which only includes the first object within the adjustable first depth range.

11. The image process apparatus of claim 1, wherein the image capture circuit includes a stereo camera with two image sensors therein to captures the first image and the second image respectively corresponding to the original image.

12. The image process apparatus of claim 11, the image capture circuit generating the depth map based on the first image and the second image generated from the stereo camera.

13. The image process apparatus of claim 1, the frequency of the synchronized signal is changeable dependent on number of the scan line of the first and the second frames.

14. The image process apparatus of claim 12, wherein the original image includes a set of original frame, the first image includes a first set frame and the second image includes a second set of frame, wherein the depth map includes a plurality of depth map information which is generated by the image capture circuit based on the first set frame and the second set of frame.

15. The image process apparatus of claim 14, wherein the plurality of depth map information correspond to the set of original frame.

16. An image process apparatus, comprising:
an image capture circuit capturing an original image and generates a depth map corresponding to the original image, wherein the original image comprises at least a first object within an adjustable first depth range of the depth map, and the original image further comprises a first image and a second image, the first image comprises at least one first frame and the second image comprises at least one second frame, and the image capture circuit further inserts synchronized signal in each scan line of the at least one first frame and the at least one second frame;
a filter utilizing the adjustable first depth range to select the first object from the original image and generating a temporary image which includes the first object, wherein the temporary image is within the original image and corresponds to the adjustable first depth range; and
a mixture circuit combines the temporary image with the input image, and generates a blending image which includes the input image and the first object.

17. The image process apparatus of claim 16, wherein the filter further includes a recognition device to identify the first object in the adjustable first depth range which is moving, and to generate a temporary image which only includes the first object within the adjustable first depth range.

18. The image process apparatus of claim 16, wherein a view angle of the image capture circuit is adjustable, either manually or automatically.

* * * * *